(12) United States Patent
Sridharan et al.

(10) Patent No.: US 10,177,828 B2
(45) Date of Patent: Jan. 8, 2019

(54) AMPLITUDE AND PHASE CALIBRATION AT A TRANSMITTER CHIP IN AN ANTENNA ARRAY

(71) Applicant: MOVANDI CORPORATION, Newport Beach, CA (US)

(72) Inventors: Kartik Sridharan, San Diego, CA (US); Ahmadreza Rofougaran, Newport Beach, CA (US); Michael Boers, South Turramurra (AU); Seunghwan Yoon, Irvine, CA (US); Sam Gharavi, Irvine, CA (US); Donghyup Shin, Irvine, CA (US); Farid Shirinfar, Granada Hills, CA (US); Stephen Wu, Fountain Valley, CA (US); Maryam Rofougaran, Rancho Palos Verdes, CA (US)

(73) Assignee: MOVANDI CORPORATION, Newport Beach, CA (US)

( * ) Notice: Subject to any disclaimer, the term of this patent is extended or adjusted under 35 U.S.C. 154(b) by 0 days.

(21) Appl. No.: 15/587,149

(22) Filed: May 4, 2017

(65) Prior Publication Data

US 2018/0323853 A1 Nov. 8, 2018

(51) Int. Cl.
*H04B 1/02* (2006.01)
*H04B 7/06* (2006.01)

(52) U.S. Cl.
CPC ......... *H04B 7/0656* (2013.01); *H04B 7/0617* (2013.01)

(58) Field of Classification Search
CPC ..................... H04B 7/0656; H04B 7/0617

USPC .......................................... 455/101
See application file for complete search history.

(56) References Cited

U.S. PATENT DOCUMENTS

| 2006/0007040 A1 | 1/2006 | Kawasaki |
| 2011/0134001 A1 | 6/2011 | Sakata et al. |
| 2012/0146841 A1* | 6/2012 | Ookawa ................. H01Q 3/267 342/174 |

OTHER PUBLICATIONS

Office Action in U.S. Appl. No. 15/847,615 dated Feb. 27, 2018.
U.S. Appl. No. 15/587,189, filed May 4, 2017.
Notice of Allowance in U.S. Appl. No. 15/847,615 dated Jul. 6, 2018.
Supplemental Notice of Allowance in U.S. Appl. No. 15/847,615 dated Sep. 25, 2018.

* cited by examiner

*Primary Examiner* — Sanh D Phu
(74) *Attorney, Agent, or Firm* — CHIP

(57) ABSTRACT

A calibration system, in a transmitter chip, selects a first transmit path for a first transmit signal and a second transmit path for a second transmit signal. The plurality of transmit paths are associated with a plurality of antenna elements. A first signal parameter of the second transmit signal is adjusted relative to the first signal parameter of the first transmit signal to maximize a first signal strength value of an added signal or minimize a second signal strength value of a subtracted signal. An offset of the first signal parameter is calibrated based on the adjusted first signal parameter in the second transmit path. A value of a second signal parameter is calibrated based on a matching of the second signal parameter in the second transmit path relative to the second signal parameter in the first transmit path.

14 Claims, 9 Drawing Sheets

AMPLITUDE AND PHASE CALIBRATION AT A TRANSMITTER CHIP IN AN ANTENNA ARRAY

CROSS-REFERENCE TO RELATED APPLICATIONS/INCORPORATION BY REFERENCE

This Application makes reference to application Ser. No. 15/587,189 which is filed concurrently herewith.

The above referenced Application is hereby incorporated herein by reference in its entirety.

FIELD OF TECHNOLOGY

Certain embodiments of the disclosure relate to an antenna array in a wireless system. More specifically, certain embodiments of the disclosure relate to a method and system for calibration of a transmitter chip in a antenna array.

BACKGROUND

Wireless telecommunication in modern times is witnessing various multipath propagation techniques and methods, such as multi-antenna array system, for enhancing capacities of radio channels. Exemplary use cases of the multi-antenna array system are beam forming and beam steering techniques. In accordance with such techniques, a transmitter radiates or steers radio waves in a specific direction by adjusting amplitude and phase of a transmission signal from each of the active antennas of the multi-antenna array system. Likewise, a receiver receives the radio waves via each antenna element from a plane wave in only a selected direction combined coherently.

However, in certain scenarios, transmitters may observe a deviation (or offset) in one or more signal parameters in the transmit signals during signal transmission via the antenna arrays. Similarly, receivers may observe a deviation (or offset) in the one or more signal parameters in the receive signals during signal reception via the antenna arrays. The deviation may be the result of, for example, process variation, component mismatch, and/or aging. Such deviation (or offset) in the one or more signal parameters may result in degraded signal transmission and reception as well. Thus, there is a need for a calibration system that can calibrate one or more signal parameters to minimize such deviation (or offset) therein.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for calibration of signal parameters at a transmitter chip in an antenna array, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for calibration of signal parameters at a transmitter chip in an antenna array of a communication device. In the following description, reference is made to the accompanying drawings, which form a part hereof, and in which is shown, by way of illustration, various embodiments of the present disclosure.

Figure 1:
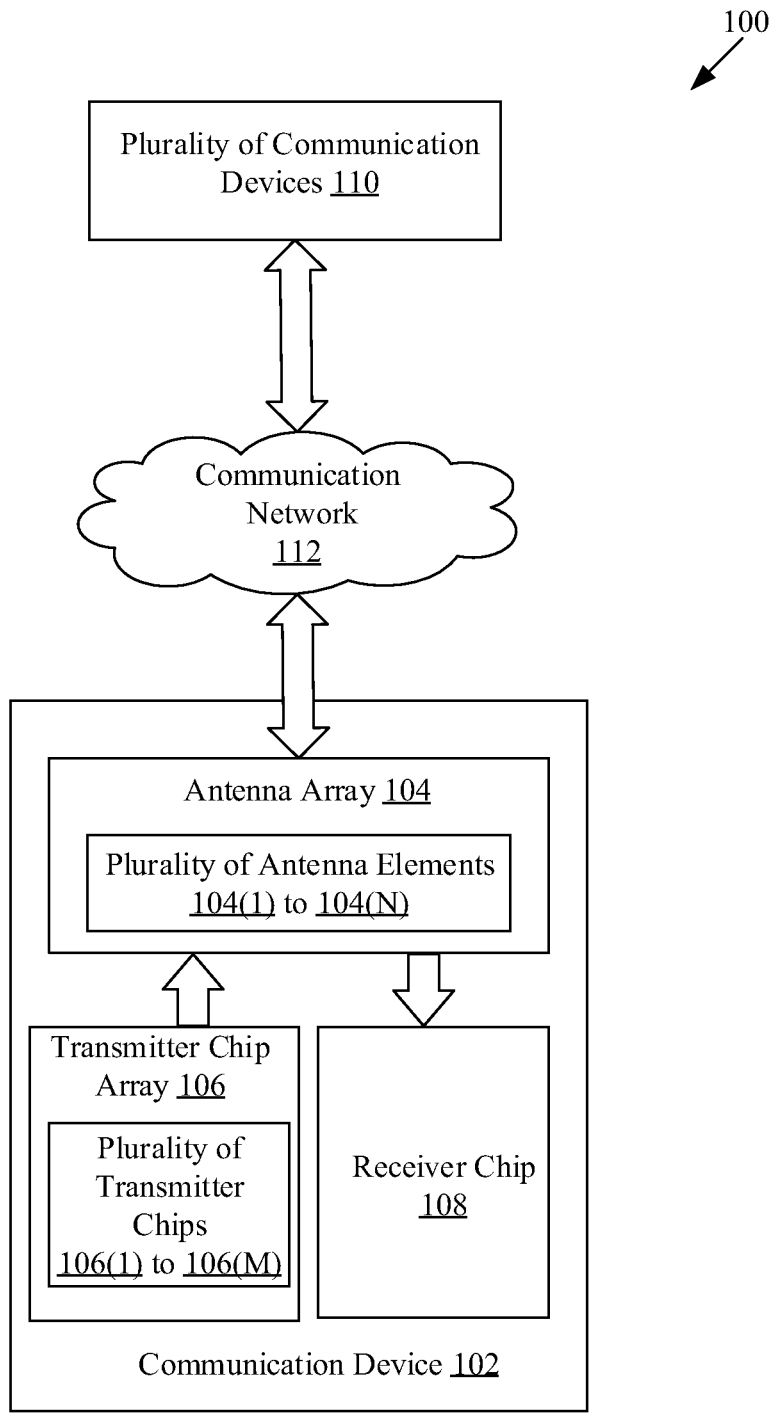
FIG. 1 is a network environment diagram that illustrates an exemplary communication device in communication with other communication devices via a communication network, in accordance with an exemplary embodiment of the disclosure.

FIG. 1 is a network environment diagram that illustrates an exemplary communication device in communication with other communication devices via a communication network, in accordance with an exemplary embodiment of the disclosure. With reference to FIG. 1, there is shown a communication device 102 that may include a plurality of antenna elements 104(1) to 104(N), collectively referred to as an antenna array 104 or steerable antenna array 104, in a network environment 100. The communication device 102 may further include a plurality of transmitter chips 106(1) to 106(M), collectively referred to as a transmitter chip array 106. The communication device 102 may further include a plurality of receiver chips 108. A plurality of communication devices 110 may communicate amongst each other and the communication device 102 via a communication network 112. Due to "N" antenna in the plurality of antenna elements, the communication device 102 may facilitate "N" transmit paths and "M" receive paths, where N, and M are integers that may or may not be equal.

Each of the plurality of transmitter chips 106 may comprise various circuits, such as a transmitter (Tx) radio frequency (RF) frontend, a digital to analog converter (DAC), a power amplifier (PA), and other miscellaneous components, such as filters (that reject unwanted spectral components) and mixers (that modulates a frequency carrier signal with an oscillator signal). The receiver chips 108 may comprise various circuits, such as a receiver (Rx) RF frontend, an analog to digital converter (ADC), a low noise amplifier (LNA), and other miscellaneous components, such as filters, mixers, and frequency generators. In general, the communication network 112 may be a mobile communication network that facilitates various wireless communication standards, such as, but not limited to, IEEE 802.11n (Wi-Fi), IEEE 802.11ac (Wi-Fi), HSPA+(3G), WiMAX (4G), and Long Term Evolution (4G), 5G, power-line communication for 3-wire installations as part of ITU G.hn standard, and HomePlug AV2 specification. In accordance with an embodiment, the communication network 112 may facilitate extremely high frequency (EHF), which is the band of radio frequencies in the electromagnetic spectrum from 30 to 300 gigahertz. Such radio frequencies have wavelengths from ten to one millimeter, referred to as millimeter wave (mmW).

In accordance with an embodiment, the communication device 102 may be housed and coupled with the base station. Thus, the antenna array 104 in the communication device 102 may also be coupled to the base station. In accordance with another embodiment, the communication device 102 may be coupled with a mobile device. The antenna array 104 may relay (or transmit) radio signals into a cell of the communication network 112, and vice versa. In an exemplary aspect, the antenna array 104 may be integrated in a plurality of antenna modules of the base station or the mobile device. In another exemplary aspect, one or more circuits of each of the transmitter chip array 106 may be integrated in the plurality of antenna modules of the base station or the mobile device. Such integration may, for example, reduce the costs and power consumption of the base station or the mobile device. Further, space needed to house the hardware components of the base station or the mobile device is also reduced.

The antenna array 104 may relay a directed beam in different directions to improve service coverage within the cells of the communication network 112. The directed beam may be generated by one or more circuits in the communication device 102 based on various beam forming techniques. Such beam forming techniques may rely on defined phase and amplitude relationships between the plurality of paths associated with the plurality of antenna elements 104(1) to 104(N) of the antenna array 104.

In accordance with an exemplary embodiment, one or more circuits in a transmitter chip, such as the transmitter chip 106(1), may be configured to calibrate one or more signal parameters at the transmit paths within the transmitter chip 106(1), hereinafter referred to as intra-chip calibration. The transmit paths may be calibrated to provide one or more matched signal parameters, such as phase and amplitude (or gain), between the plurality of antenna elements 104(1) to 104(N) of the antenna array 104. Such calibration may correct a relative error or relative deviation between values of the one or more signal parameters along each of the transmit paths in the transmitter chip 106(1). The correction of the relative error or relative deviation may be performed based on an appropriate adjustment in the values of the one or more signal parameters in a specified pattern, as described in the following FIGS. 2, 3, and 5. Accordingly, the relative error or relative deviation between values of the one or more signal parameters may be corrected to yield matched values of the one or more signal parameters, across the plurality of transmit paths, in order to allow for beam forming techniques.

In accordance with another embodiment, one or more circuits in a transmitter chip, such as the transmitter chip 106(1), may be configured to calibrate two or more from the transmitter chips 106(2) to 106(M) based on two or more output signals provided by the two or more other transmitter chips 106(2) to 106(M), hereinafter referred to as inter-chip calibration. The inter-chip calibration provides one or more matched signal parameters, such as phase and amplitude (or gain), based on a plurality of output signals received from different transmitter chips in the transmitter chip array 106. Such calibration may correct a relative error or relative deviation between values of the one or more signal parameters across multiple transmitter chips in the transmitter chip array 106. The correction of the relative error or relative deviation may be performed based on an appropriate adjustment in the values of the one or more signal parameters in a specified pattern, as described in the following FIGS. 2, 4A, 4B, and 6. Accordingly, the relative error or relative deviation between values of the one or more signal parameters may be corrected to yield matched values of the one or more signal parameters across multiple transmitter chips, in order to allow for beam forming techniques.

It is to be understood by those skilled in the art that such calibration may be a one-time calibration (for example, using RF-BIST circuitry on a production tester) or a frequently (for example, one or more times daily, weekly, monthly or any other suitable period) running calibration, without departure from the scope of the present disclosure. Further, it is to be understood that various transmit and receive paths may have an allowable range of offset (or deviation) for one or more signal parameters. For example, an allowable phase offset may be less than 360 degrees.

In accordance with another embodiment, the receiver chips 108 may be configured to receive a plurality of output signals, transmitted by the other transmitter chips, at the plurality of input interfaces of the plurality of receive paths. Thereafter, the receiver chips 108 may determine a first frequency of each of a first output signal and a second output signal of the plurality of output signals based on mixing of a second frequency generated by a local oscillator with both of the first output signal and the second output signal. It may be noted that in this case the mixing is described to be performed before the calibration operation. However, it should not be construed to be limiting the scope of the disclosure. Notwithstanding, in accordance with an embodiment, the mixing may be performed after the calibration also, without deviation from the scope of the disclosure.

Further, the LNA, connected in each of the plurality of receive paths, may amplify the first frequency of each of a first output signal and a second output signal of the plurality of output signals. The receiver chips 108 may select a first receive path and a second receive path from the plurality of receive paths. In accordance with an embodiment, the receiver chips 108 may select the first receive path and the second receive path based on an adjacency criteria. In accordance with another embodiment, the receiver chips 108 may select the first receive path and the second receive path based on a round-robin criteria.

In accordance with an embodiment, the receiver chips 108 may be configured to add the first frequencies of the first output signal and the second output signal, and determine first signal strength value of the added signal. Accordingly, the receiver chips 108 may be configured to calibrate one or more signal parameters in the first receive path relative to the second receive path, based on the maximized first signal strength value of the added signal. In accordance with another embodiment, the receiver chips 108 may be configured to subtract the first frequencies of the first output signal and the second output signal, and determine second signal strength value of the subtracted signal. Accordingly, the receiver chips 108 may be configured to calibrate one or more signal parameters in the first receive path relative to the second receive path, based on a minimized second signal strength value of the subtracted signal. Consequently, a final signal may be generated based on the calibration.

Figure 2:
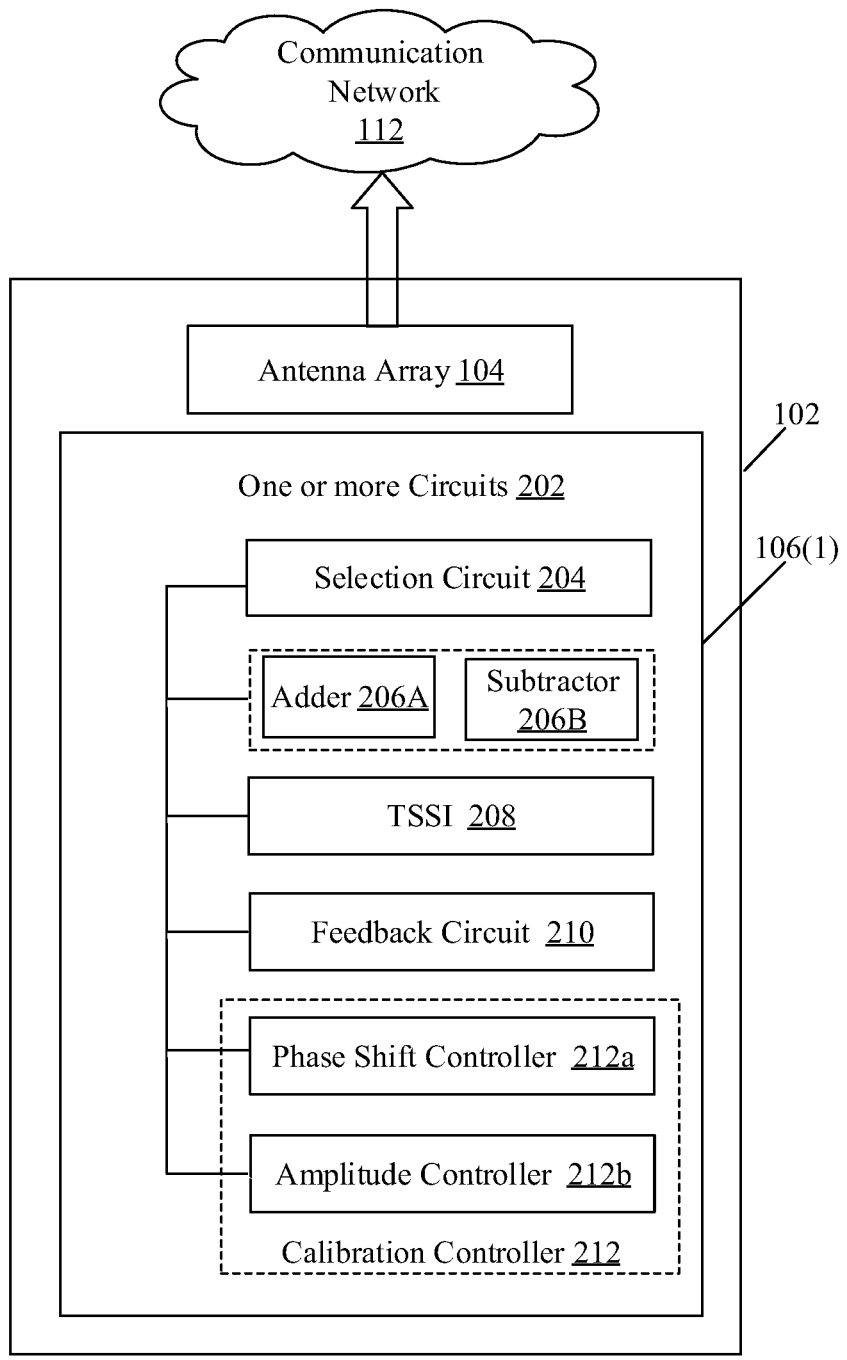
FIG. 2 depicts a block diagram illustrating various components of an exemplary communication device, in accordance with an exemplary embodiment of the disclosure.

FIG. 2 depicts a block diagram illustrating various components of an exemplary communication device, in accordance with an exemplary embodiment of the disclosure. With reference to FIG. 2, there is shown the transmitter chip 106(1) in the communication device 102. The transmitter chip 106(1) may include one or more circuits 202. The one or more circuits 202 may further include a selection circuit 204, one of an adder 206A or a subtractor 206B, a transmitter signal strength indicator (TSSI) 208, a feedback circuit 210, and a calibration controller 212. The calibration controller 212 may further include a phase shift controller 212a and an amplitude controller 212b. It may be noted that the TSSI 208 may be interchangeably utilized with a receiver signal strength indicator (RSSI) in various embodiments if inter-chip calibration or intra-chip calibration is used as described in the disclosure.

The one or more circuits 202 may further include a central band processing unit (not shown) configured to receive a base station signal from a base station (not shown) via a digital interface. The central band processing unit may communicate the received digital base station signal to the DAC in the one or more circuits 202. The DAC converts the digital base station signal to an analog signal which is further communicated to a power amplifier in the one or more circuits 202 for up-conversion and amplification. The analog signal may be forwarded to a plurality of transmit paths. Each of the plurality of transmit paths run from the power amplifier across a passive feeder network and an optional duplex filter and is terminated by an antenna element of the plurality of antenna elements 104(1) to 104(N). The passive feeder network imposes fixed one or more signal parameters between individual ones of the plurality of transmit paths. The optional duplex filter communicates the analog signals to the plurality of antenna elements 104(1) to 104(N).

In accordance with an embodiment, the one or more circuits 202 may calibrate one or more signal parameters in order to provide defined signal parameters between at least two of the plurality of transmit paths associated with the plurality of antenna elements 104(1) to 104(N). Examples of such one or more signal parameters may include, but not limited to, phase and amplitude (or gain). Such calibration allows a correction of an offset (or deviation) of the one or more signal parameters accumulated along individual transmit paths of the plurality of antenna elements 104(1) to 104(N). Based on such calibration, the one or more signal parameters may be matched across the plurality of transmit paths in the transmitter chip 106(1).

In accordance with such an embodiment, a first calibration system, alternatively referred to as an intra-chip calibration system, may be implemented to calibrate the one or more signal parameters at an individual transmitter chip, such as the transmitter chip 106(1). With reference to the intra-chip calibration system, the selection circuit 204 of the one or more circuits 202 may be configured to select a first transmit path (for a first transmit signal) and a second transmit path (for a second transmit signal) from a plurality of transmit paths within the transmitter chip 106(1). It is to be noted that each of the plurality of transmit paths may be associated with a corresponding antenna element of the plurality of antenna elements 104(1) to 104(N) of the antenna array 104. In accordance with an embodiment, during the first iteration, the selection circuit 204 may select the first transmit path and the second transmit path based on an adjacency criteria. In accordance with another embodiment, during the subsequent iterations, the selection circuit 204 may select the first transmit path and the second transmit path based on a round-robin criteria.

In accordance with an embodiment, the first transmit signal and the second transmit signal may be communicated to the adder 206A from the selection circuit 204. The adder 206A of the one or more circuits 202 may be configured to add the first transmit signal and the second transmit signal and generate an added signal. In accordance with an embodiment, the adder 206A may be of active current-mode type. In accordance with another embodiment, the adder 206A may be of passive type. The adder 206A may be configured to communicate the added signal to the TSSI 208. The TSSI 208 may be configured to indicate the first signal strength value of the added signal. The feedback circuit 210 may be configured to determine a feedback signal and communicate the feedback signal to the calibration controller 212.

In accordance with another embodiment, the first transmit signal and the second transmit signal may be communicated to the subtractor 206B from the selection circuit 204. The subtractor 206B of the one or more circuits 202 may be configured to subtract the first transmit signal and the second transmit signal and generate a subtracted signal. The subtractor 206B may be configured to communicate the subtracted signal to the TSSI 208. The TSSI 208 may be configured to indicate the second signal strength value of the subtracted signal.

The feedback circuit 210 may be configured to determine a feedback signal based on the first signal strength value of the second signal strength value and communicate the feedback signal to the calibration controller 212. A phase shift controller 212a in the calibration controller 212 may be configured to adjust a first signal parameter, i.e. the phase, of the second transmit signal in the second transmit path relative to the first signal parameter of the first transmit signal in the first transmit path.

In accordance with an embodiment, the phase shift controller 212a may perform an adjustment in the phase value of the second transmit signal until the first signal strength value of the added signal is maximized. The TSSI 208 may be configured to indicate the maximized first signal strength value of the added signal. In accordance with another embodiment, the phase shift controller 212a may perform an adjustment in the phase value of the second transmit signal until the second signal strength value of the subtracted signal is minimized. The TSSI 208 may be configured to indicate the minimized second signal strength value of the subtracted signal. Such an adjustment of the first signal parameter of the second transmit signal may be independent of the value of the adjustment of the second signal parameter of the second transmit signal.

Further, the amplitude controller 212b in the calibration controller 212 may be configured to independently turn on the first transmit path and the second transmit path. The amplitude controller 212b may be further configured to adjust the second signal parameter, i.e. the amplitude, of the second transmit signal in the second transmit path until the second signal parameter of the second transmit signal matches the second signal parameter of the first transmit signal.

The calibration controller 212 of the one or more circuits 202 may be configured to calibrate an offset of the first signal parameter based on the adjusted first signal parameter of the second transmit signal. The calibration controller 212 may be further configured to calibrate a value of a second signal parameter based on the matching of the second signal parameter of the second transmit signal relative to the second signal parameter of the first transmit signal.

The transmitter chip 106(1) may be configured to transmit an output signal with the calibrated offset of the first signal parameter and the calibrated value of the second signal parameter, via an antenna element of the plurality of antenna elements 104(1) to 104(N), to the communication network 112. In accordance with an embodiment, the plurality of antenna elements 104(1) to 104(N) of the antenna array 104 may be integrated in a plurality of antenna modules of a base station or a mobile device. In accordance with an embodiment, the one or more circuits 202 may be integrated in the plurality of antenna modules of the base station or a mobile device.

In accordance with another embodiment, a second calibration system, alternatively referred to as an inter-chip calibration system, may be implemented to calibrate the one or more signal parameters at the transmitter chip 106(1) with respect to one or more other transmitter chips 106(2) to 106(M) in the transmitter chip array 106. With reference to the inter-chip calibration system, the one or more circuits 202 in the transmitter chip 106(1) may be configured to receive two or more output signals from the two or more other transmitter chips 106(2) to 106(M). The communication device 102 may include the plurality of transmitter chips 106(1) to 106(M) in a case when a single transmitter chip may not be able to accommodate a plurality of transmit paths required in a multi-antenna array system. Such two one or more output signals have a calibrated offset of a first signal parameter, such as the phase, and a calibrated value of a second signal parameter, such as the amplitude, determined at the two or more other transmitter chips 106(2) to 106(M) in a similar manner, as determined in the intra-chip calibration system, as described above, and further described in FIGS. 4 and 6.

Figure 3:
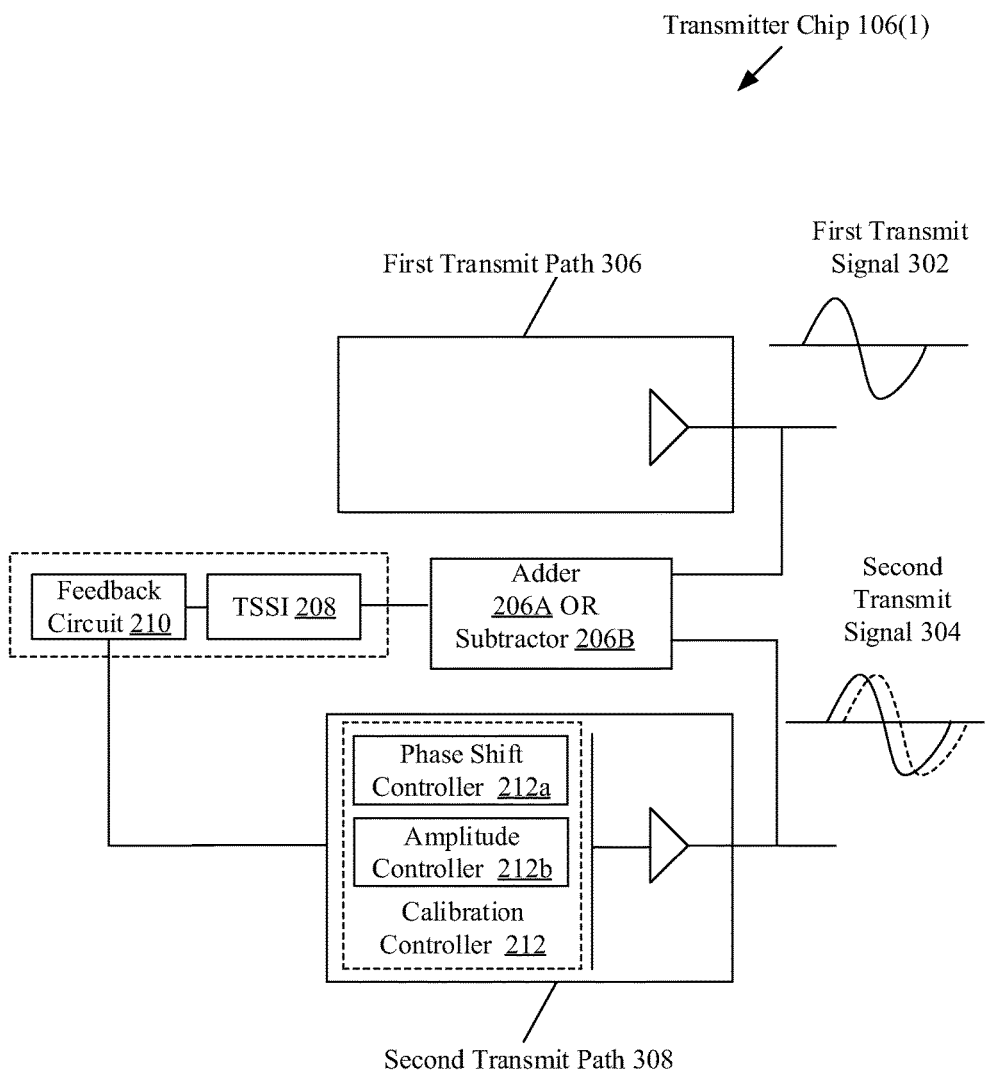
FIG. 3 depicts an exemplary scenario for intra-chip calibration of signal parameters at a transmitter chip, in accordance with an exemplary embodiment of the disclosure.

FIG. 3 depicts an exemplary scenario for intra-chip calibration of signal parameters at a transmitter chip, in accordance with an exemplary embodiment of the disclosure. With reference to FIG. 3, there is shown a first transmit signal 302, a second transmit signal 304, a first transmit path 306, a second transmit path 308, a first antenna element 104(1), and a second antenna element 104(2) in the block diagram of the transmitter chip 106(1). There is further shown the selection circuit 204, one of the adder 206A or the subtractor 206B, the TSSI 208, the feedback circuit 210, and the calibration controller 212, as described in FIG. 2. It may be noted that for brevity, only two transmit signals, two transmit paths, and two antenna elements in the transmitter chip 106(1) have been discussed. Notwithstanding, the disclosure is not so limited, and there may be more than two transmit signals, two transmit paths, and two antenna elements, without deviation from the scope of the disclosure.

With reference to FIG. 3, the selection circuit 204 selects the first transmit path 306 for the first transmit signal 302 and the second transmit path 308 for the second transmit signal 304. The first transmit path 306 and the second transmit path 308 are associated with the first antenna element 104(1) and the second antenna element 104(2), respectively.

In the first iteration, the selection circuit 204 of the one or more circuits 202 may be configured to select the first transmit path 306 and the second transmit path 308 based on an adjacency criteria. In other words, the first transmit path 306 and the second transmit path 308 are selected by the selection circuit 204 in the first instance as the first transmit path 306 and the second transmit path 308 are adjacent with respect to each other.

Thereafter, in accordance with an embodiment, the selection circuit 204 communicates the first transmit signal 302 and the second transmit signal 304 to the adder 206A. The adder 206A adds the first transmit signal 302 and the second transmit signal 304 and generates an added signal. The added signal is communicated to the TSSI 208. The TSSI 208 indicates the first signal strength value of the added signal. In accordance with another embodiment, the selection circuit 204 communicates the first transmit signal 302 and the second transmit signal 304 to the subtractor 206B. The subtractor 206B subtracts the first transmit signal 302 and the second transmit signal 304 and generates a subtracted signal. The subtracted signal is communicated to the TSSI 208. The TSSI 208 indicates the second signal strength value of the subtracted signal.

The feedback circuit 210 provides the feedback signal to the calibration controller 212 based on the first signal strength value of the added or the second signal strength value of the subtracted signal, indicated by the TSSI 208. The phase shift controller 212a in the calibration controller 212 adjusts the phase value of the second transmit signal 304 relative to the phase value of the first transmit signal 302. The phase shift controller 212a performs the adjustment till the first signal strength value of the added signal is maximized or the second signal strength value of the subtracted signal is minimized, as indicated by the TSSI 208.

Further, the amplitude controller 212b independently turns on the first transmit path 306 and the second transmit path 308. The amplitude controller 212b further adjusts the amplitude value of the second transmit signal 304 until the value matches the amplitude value of the first transmit signal 302.

Accordingly, the calibration controller 212 calibrates an offset of the phase value based on the adjusted phase value of the second transmit signal 304. The calibration controller 212 further calibrates the amplitude value of the second transmit signal 304, based on the matching of the amplitude value of the second transmit signal 304 relative to the amplitude value of the first transmit signal 302.

In the subsequent next iterations, the selection circuit 204 may select next transmit paths, such as a third transmit path (not shown) and the second transmit path 308 based on a round-robin criteria. Subsequent steps to calibrate the third transmit signal with respect to the second transmit signal 304 are same as discussed above. Thus, at the end of the last iteration, the phase value and the amplitude value, are calibrated across the plurality of transmit paths and thus, match with each other, which may include the phase value and the amplitude value falling within an acceptable range.

Once the phase value and the amplitude value are calibrated across the plurality of transmit paths, the transmitter chip 106(1) transmits a calibrated output signal with the calibrated offset of the phase value and the calibrated amplitude value, via the plurality of antenna elements 104(1) to 104(N), to the communication network 112.

Figure 4A:
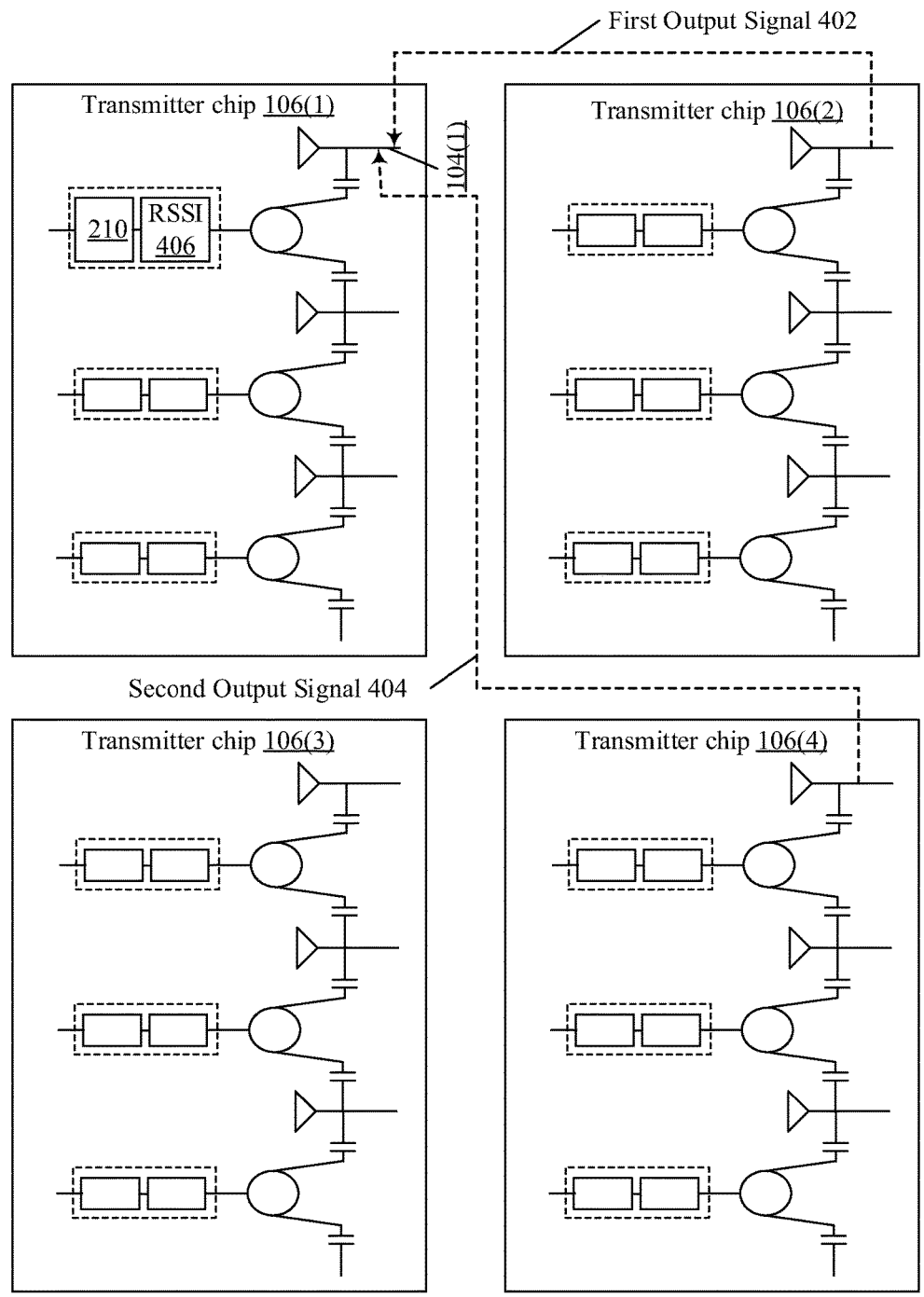
FIG. 4A depicts an exemplary scenario for inter-chip calibration of signal parameters at a transmitter chip in a transmitter chip array, in accordance with an exemplary embodiment of the disclosure.
Figure 4B:
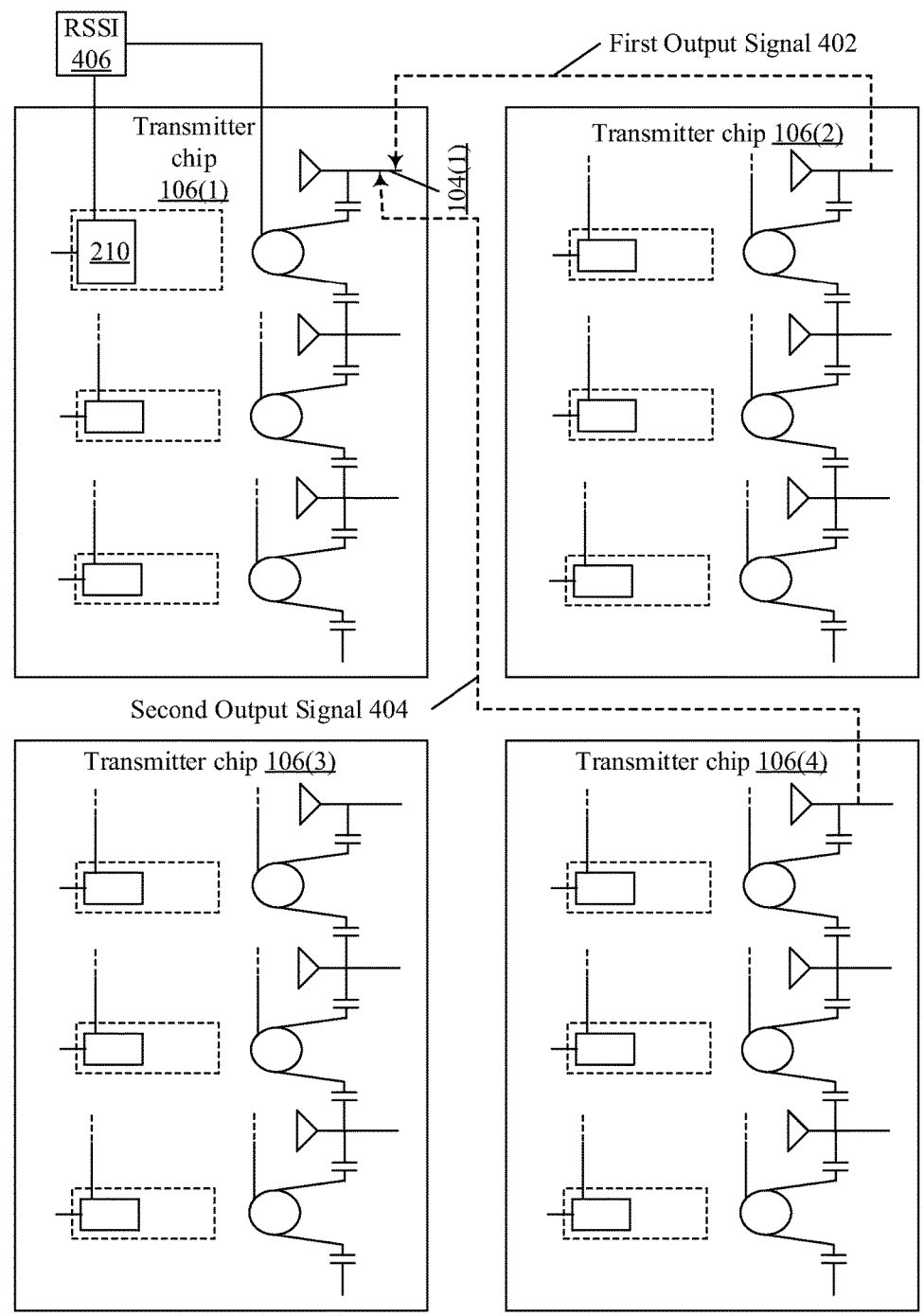
FIG. 4B depicts another exemplary scenario for inter-chip calibration of signal parameters at a transmitter chip in a transmitter chip array, in accordance with an exemplary embodiment of the disclosure.

FIG. 4A depicts an exemplary scenario for inter-chip calibration of signal parameters at a transmitter chip in a transmitter chip array, in accordance with an exemplary embodiment of the disclosure. With reference to FIG. 4A, there is shown a first output signal 402, a second output signal 404, and a first antenna element 104(1) of a plurality of antenna elements 104 in the block diagram of the transmitter chip 106(1). There is further shown other transmitter chips 106(2), 106(3), and 106(4) in addition to the transmitter chip 106(1) in the transmitter chip array 106. The exemplary scenario also includes a received signal strength indicator (RSSI) 406 which is similar to the TSSI 208 except for the fact that the RSSI 406 indicates the signal strength of the received signals. The calibration controller 212, as described in FIG. 2, is not shown in FIG. 4A. It may be noted that, in accordance with an exemplary embodiment of the disclosure, the RSSI 406 is shown to be included in the transmitter chip 106(1). Notwithstanding, the disclosure may not be so limited, and in accordance with other exemplary embodiments, the RSSI 406 may be included in other transmitter chips 106(2), 106(3), and 106(4) or sources other than the illustrated transmitter chips 106(1), 106(2), 106(3), and 106(4), as illustrated in FIG. 4B, without deviation from the scope of the disclosure.

The first output signal 402 is provided by the transmitter chip 106(2). Likewise, the second output signal 404 is provided by the transmitter chip 106(3). The first output signal 402 and the second output signal 404 are calibrated output signals (with corresponding calibrated offset of phase value and calibrated amplitude value) generated by the transmitter chips 106(2) and 106(3), respectively, in a similar manner as described above in FIG. 3.

It may be noted that for brevity, only two output signals, one antenna element, and four transmitter chips have been discussed in FIG. 4A. Notwithstanding, the exemplary description should not be construed to be limiting, and alternative components may be selected without deviation from the scope of the disclosure. Further, the transmitter chip array 106 may include more than four transmitter chips, without deviation from the scope of the disclosure.

With reference to FIG. 4A, in the first iteration, the first antenna element 104(1) may be configured to receive the first output signal 402 and the second output signal 404 from the transmitter chip 106(2) and the transmitter chip 106(3), respectively. The transmitter chip 106(2) and the transmitter chip 106(3) may be adjacent and equidistant from the transmitter chip 106(1). In accordance with an embodiment, the first antenna element 104(1) adds the first output signal 402 and the second output signal 404 in the space and generates an added signal. The added signal is communicated to the RSSI 406. In accordance with an embodiment, the RSSI 406 indicates the first signal strength value of the added signal. In accordance with another embodiment, the first antenna element 104(1) subtracts the first output signal 402 and the second output signal 404 in the space and generates a subtracted signal. The subtracted signal is communicated to the RSSI 406. The RSSI 406 indicates the second signal strength value of the subtracted signal.

The feedback circuit 210 provides the feedback signal to the calibration controller 212 based on the first signal strength value of the added signal or the second signal strength value of the subtracted signal, indicated by the RSSI 406. The calibration controller 212 may calibrate the offset by one-time measurement. The phase shift controller 212a in the calibration controller 212 adjusts the phase value of the second output signal 404 relative to the phase value of the first output signal 402.

In accordance with an embodiment, the phase shift controller 212a performs the adjustment to maximize the first signal strength value of the added signal indicated by the RSSI 406. In accordance with another embodiment, the phase shift controller 212a performs the adjustment to minimize the second signal strength value of the subtracted signal indicated by the RSSI 406. Further, the amplitude controller 212b independently adjusts the amplitude value of the second output signal 404 until the amplitude value of the second output signal 404 matches the amplitude value of the first output signal 402.

Accordingly, the calibration controller 212 calibrates an offset of the phase value based on the adjusted phase value of the second output signal 404. The calibration controller 212 further calibrates the amplitude value of the second output signal 404, based on the matching of the amplitude value of the second output signal 404 relative to the amplitude value of the first output signal 402. In the subsequent next iterations, the output signals from other transmitter chips may be selected based on, for example, a round-robin criteria. Thus, at the end of the last iteration, the phase value and the amplitude value, are calibrated across the plurality of transmitter chips and thus, match with each other.

FIG. 4B depicts another exemplary scenario for inter-chip calibration of signal parameters at a transmitter chip in a transmitter chip array, in accordance with an exemplary embodiment of the disclosure. It may be noted that the components and functionality of FIG. 4B is same as that of the components and functionality of FIG. 4A, except for the point of implementation of the RSSI 406. FIG. 4A illustrates that the RSSI 406 is a component of the transmitter chip 106(1), whereas FIG. 4B illustrates that the RSSI 406 may be located anywhere outside the transmitter chip 106(1).

Figure 5:
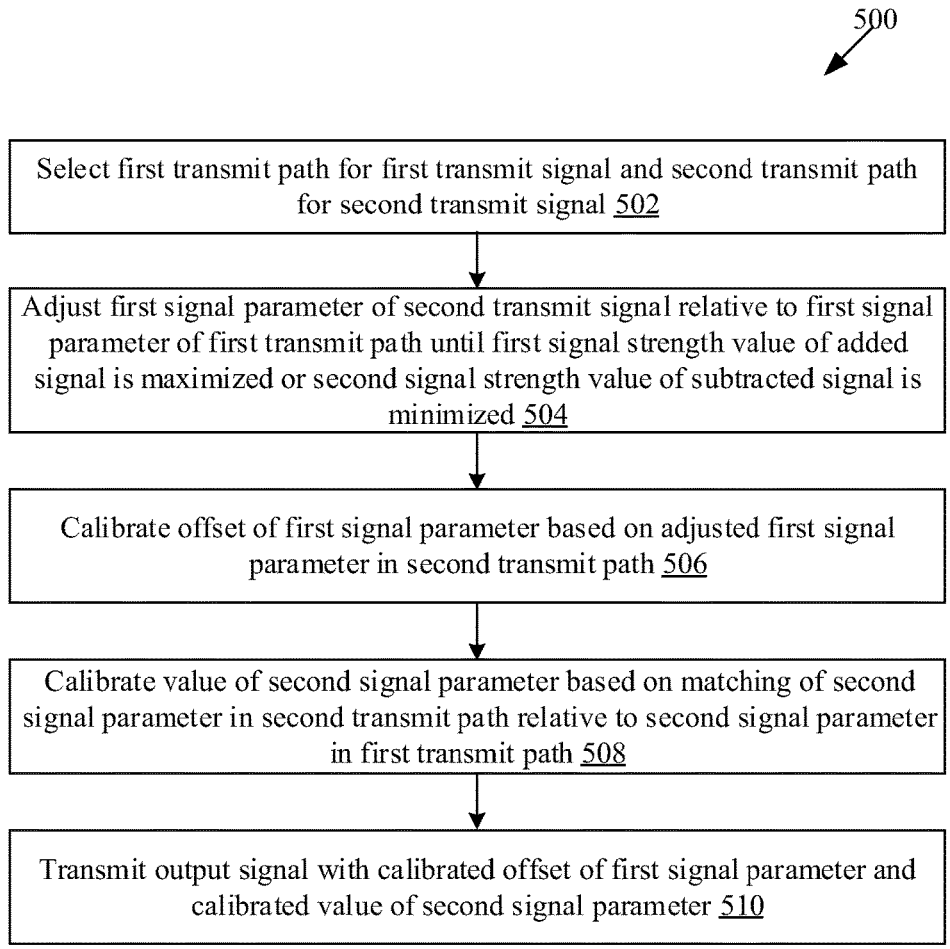
FIG. 5 depicts a first flow chart illustrating exemplary operations for intra-chip calibration of signal parameters at a transmitter chip of FIGS. 1 to 3, in accordance with an exemplary embodiment of the disclosure.

FIG. 5 depicts a first flow chart illustrating exemplary operations for intra-chip calibration of signal parameters at a transmitter chip FIGS. 1 to 3, in accordance with an exemplary embodiment of the disclosure. Referring to FIG. 5, there is shown a flow chart 500 comprising exemplary operations 502 through 510.

At 502, a first transmit path (for a first transmit signal) and a second transmit path (for a second transmit signal) may be selected from a plurality of transmit paths within the transmitter chip 106. In accordance with an embodiment, during the first iteration, the selection circuit 204 of the one or more circuits 202 may be configured to select the first transmit path 306 and the second transmit path 308 based on an adjacency criteria. However, in accordance with another embodiment, during subsequent iterations, the selection circuit 204 of the one or more circuits 202 may be configured to select the first transmit path 306 and the second transmit path 308 based on a round-robin criteria.

At 504, a first signal parameter of the second transmit signal 304 may be adjusted relative to the first signal parameter of the first transmit signal 302. The phase shift controller 212a may be configured to adjust the first signal parameter of the second transmit signal 304 relative to the first signal parameter of the first transmit signal 302.

Prior to adjustment, in accordance with an embodiment, the adder 206A of the one or more circuits 202 may be configured to add the first transmit signal 302 and the second transmit signal 304 and communicate the added signal to the TSSI 208. The TSSI 208 may be configured to indicate the first signal strength value of the added signal. In accordance with another embodiment, the subtractor 206B of the one or more circuits 202 may be configured to subtract the first transmit signal 302 and the second transmit signal 304 and communicate the subtracted signal to the TSSI 208. The TSSI 208 may be configured to indicate the second signal strength value of the subtracted signal.

The feedback circuit 210 provides the feedback signal to the calibration controller 212. The phase shift controller 212a adjusts the first signal parameter, i.e. phase, of the second transmit signal 304 relative to the first signal parameter, i.e. the phase, of the first transmit signal 302 until the first signal strength value of the added signal is maximized or the second signal strength value of the subtracted signal is minimized.

At 506, an offset of the first signal parameter may be calibrated based on the adjusted first signal parameter of the second transmit signal 304. The calibration controller 212 of the one or more circuits 202 may be configured to calibrate the offset of the first signal parameter based on the adjusted first signal parameter of the second transmit signal 304.

At 508, a value of a second signal parameter may be calibrated based on the matching of the second signal parameter of the second transmit signal 304 relative to the second signal parameter of the first transmit signal 302. The calibration controller 212 may be further configured to calibrate a value of a second signal parameter based on the matching of the second signal parameter of the second transmit signal 304 relative to the second signal parameter of the first transmit signal 302.

Prior to the calibration of the value of the second signal parameter, the amplitude controller 212b may be configured to adjust the second signal parameter of the second transmit signal 304 until the second signal parameter of the second transmit signal 304 matches the second signal parameter of the first transmit signal 302.

At 510, an output signal with the calibrated offset of the first signal parameter and the calibrated value of the second signal parameter may be transmitted, via the plurality of antenna elements 104(1) to 104(N), to the communication network 112. The transmitter chip 106 may be configured to transmit the output signal with the calibrated offset of the first signal parameter and the calibrated value of the second signal parameter. In accordance with an embodiment, the plurality of antenna elements 104(1) to 104(N) of the antenna array 104 may be integrated in a plurality of antenna modules. In accordance with an embodiment, the one or more circuits 202 may be integrated in the plurality of antenna modules. In accordance with an embodiment, the one or more circuits 202 may be integrated in a package of the plurality of antenna modules. In accordance with an embodiment, the one or more circuits 202 may be on a printed circuit board on which the plurality of antenna modules are mounted.

Figure 6:
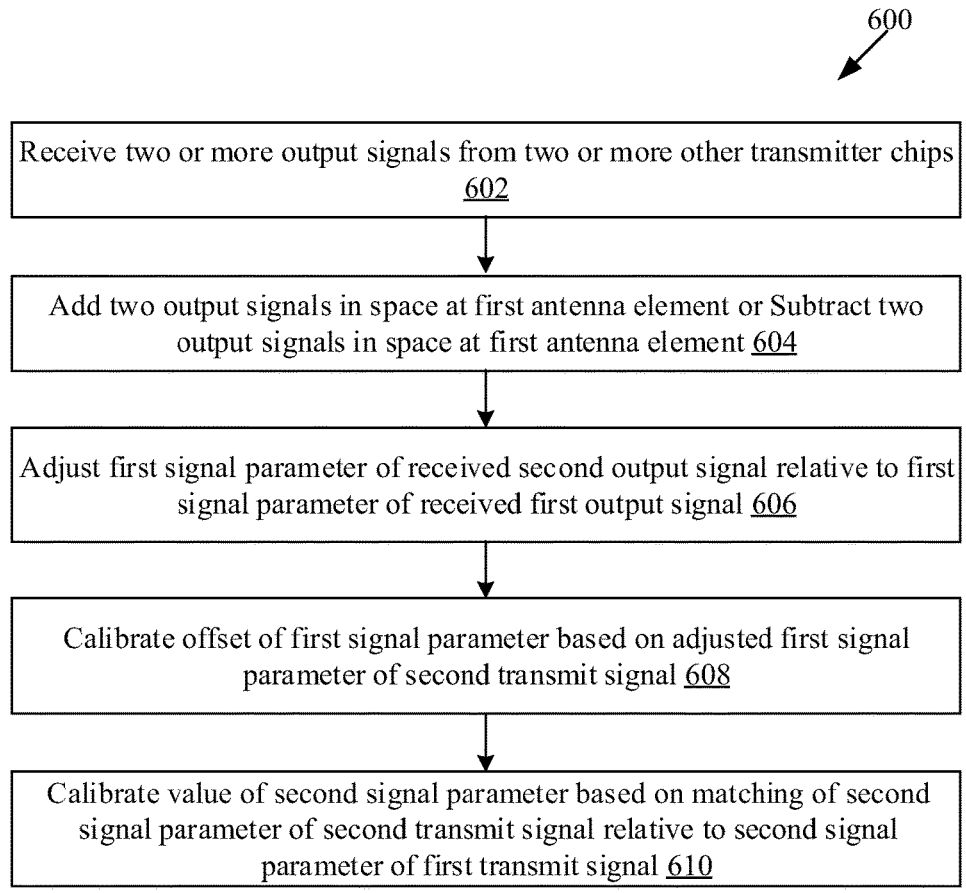
FIG. 6 depicts a second flow chart illustrating exemplary operations for inter-chip calibration of signal parameters at a transmitter chip of FIGS. 1, 2, 4A, and 4B, in accordance with an exemplary embodiment of the disclosure.

FIG. 6 depicts a second flow chart illustrating exemplary operations for inter-chip calibration of signal parameters at a transmitter chip of a communication device of FIGS. 1, 2, 4A, and 4B, in accordance with an exemplary embodiment of the disclosure. Referring to FIG. 6, there is shown a flow chart 600 comprising exemplary operations 602 through 610.

At 602, two or more output signals may be received from two or more other transmitter chips. The two or more output signals, such as the first output signal 402 and the second output signal 404, may be received at a transmitter chip, such as a transmitter chip 106(1), from one or more other transmitter chips, such as the transmitter chips 106(2) and 106(3), in the communication device 102. In accordance with an embodiment, in the first iteration, the first antenna element 104(1) may be configured to receive the first output signal 402 and the second output signal 404 from the transmitter chip 106(2) and the transmitter chip 106(3), respectively. The transmitter chip 106(2) and the transmitter chip 106(3) may be adjacent and equidistant from the transmitter chip 106(1). However, in accordance with another embodiment, during subsequent iterations, the transmitter chip 106(1) may be configured to receive output signals from other transmitter chips, such as transmitter chip 106(3), based on, for example, a round-robin criteria.

At 604, in accordance with an embodiment, the first output signal 402 and the second output signal 404 may be added in the space to generate an added signal. The first antenna element 104(1) adds the first output signal 402 and the second output signal 404 in the space to generate an added signal. The added signal is communicated to the RSSI 406, which indicates the first signal strength value of the added signal. In accordance with another embodiment, the first output signal 402 and the second output signal 404 may be subtracted in the space to generate a subtracted signal. The first antenna element 104(1) subtracts the first output signal 402 and the second output signal 404 in the space to generate the subtracted signal. The subtracted signal is communicated to the RSSI 406, which indicates the second signal strength value of the subtracted signal.

The feedback circuit 210 provides the feedback signal to the calibration controller 212. The phase shift controller 212a adjusts the first signal parameter, i.e. phase, of the received second output signal 404 relative to the first signal parameter, i.e. the phase, of the received first output signal 402.

At 606, a first signal parameter of the received second output signal 404 may be adjusted relative to the first signal parameter of the received first output signal 402. The phase shift controller 212a may be configured to adjust the first signal parameter of the received second output signal 404 relative to the first signal parameter of the received first output signal 402 until the first signal strength value of the added signal is maximized or the second signal strength value of the subtracted signal is minimized.

At 608, an offset of the first signal parameter may be calibrated based on the adjusted first signal parameter of the second output signal 404. The calibration controller 212 of the one or more circuits 202 may be configured to calibrate the phase offset of the first signal parameter based on the adjusted first signal parameter, i.e. the phase, of the second output signal 404.

At 610, a value of a second signal parameter may be calibrated based on the matching of the second signal parameter of the second output signal 404 relative to the second signal parameter of the first output signal 402. The calibration controller 212 may be further configured to calibrate a value of a second signal parameter based on the matching of the second signal parameter of the second output signal 404 relative to the second signal parameter of the first output signal 402.

Prior to the calibration of the value of the second signal parameter, the amplitude controller 212b may be configured to adjust the second signal parameter of the second output signal 404 until the second signal parameter of the second output signal 404 matches the second signal parameter of the first output signal 402.

It may be noted that, with deviation from the scope of the disclosure, the plurality of antenna elements 104(1) to 104(N) of the antenna array 104 may be integrated in a plurality of antenna modules, and further, the one or more circuits in the transmitter chip 106(1) may be integrated in the plurality of antenna modules.

Figure 7A:
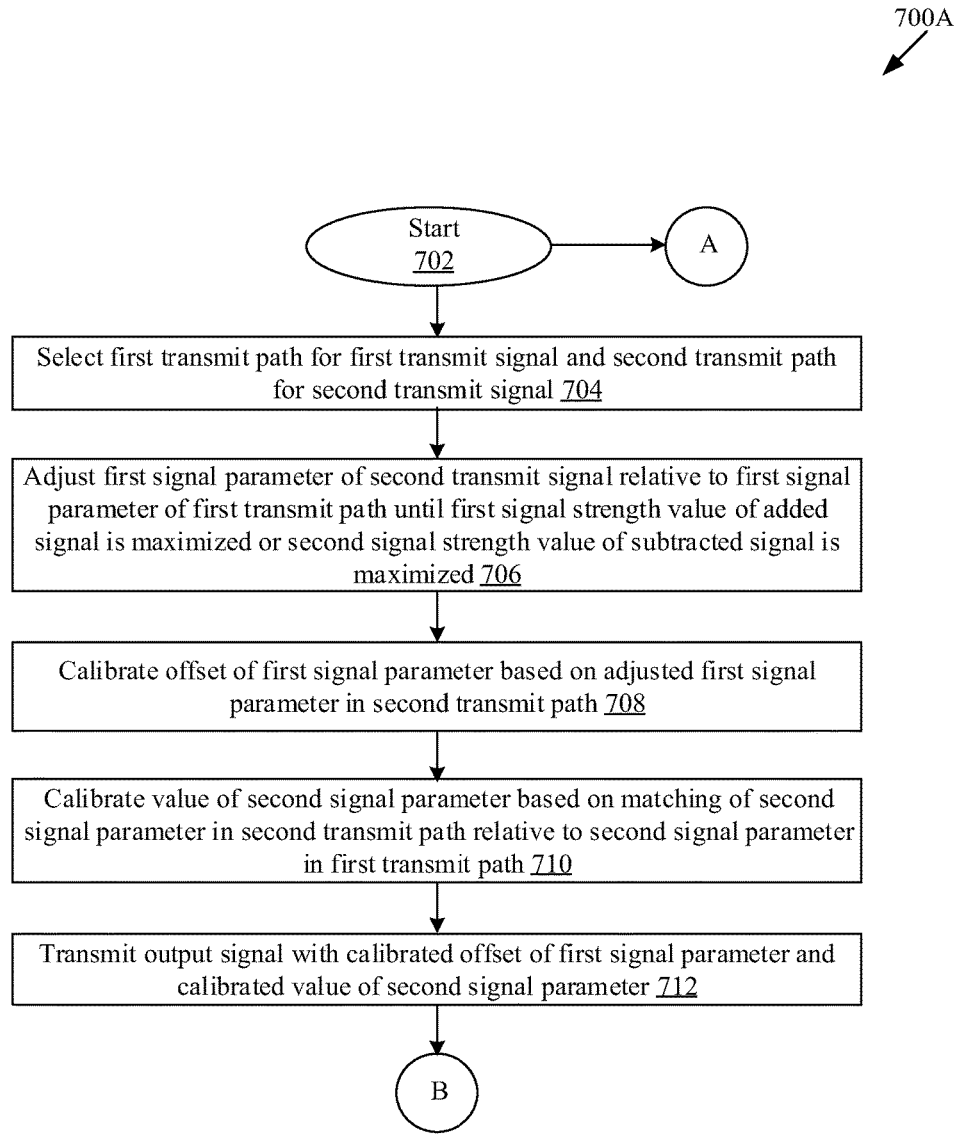
FIGS. 7A and 7B, collectively, depict a flow chart illustrating exemplary operations for an overall calibration system of signal parameters in an antenna array of FIGS. 1 to 4, in accordance with an exemplary embodiment of the disclosure.
Figure 7B:
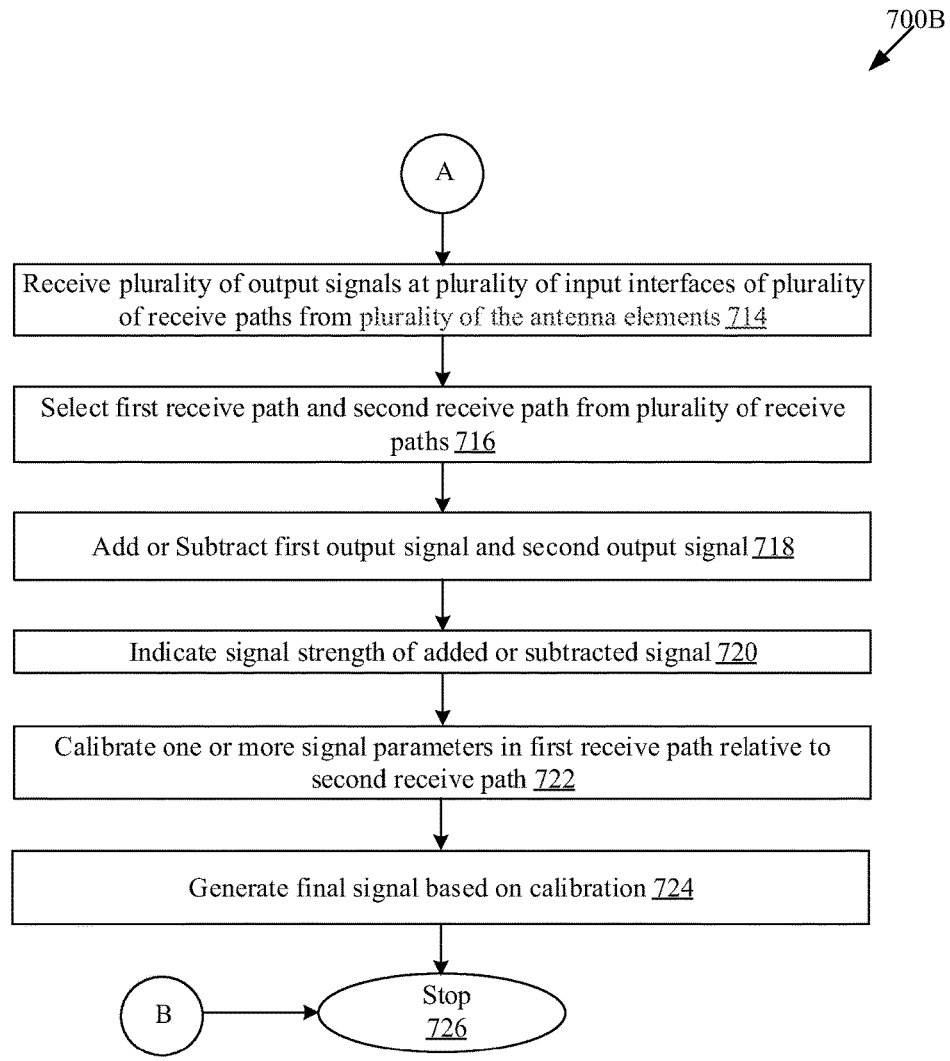

FIGS. 7A and 7B, collectively, depict a flow chart illustrating exemplary operations for an overall calibration system of signal parameters in an antenna array of FIGS. 1 to 4B, in accordance with an exemplary embodiment of the disclosure. Referring to FIGS. 7A and 7B, there are shown a flow charts 700A and 700B that start at 702 and end at 726. The control simultaneously passes to 704 and 714 from 702. Thus, the first set of exemplary operations indicated by 704 to 712, and the second set of exemplary operations indicated by 714 to 724 are executed in parallel. In accordance with an embodiment, the two set of exemplary operations may be executed in a sequence, without deviation from the scope of the disclosure.

At 704, a first transmit path (for a first transmit signal) and a second transmit path (for a second transmit signal) may be selected from a plurality of transmit paths within the transmitter chip 106. In accordance with an embodiment, during the first iteration, the selection circuit 204 of the one or more circuits 202 may be configured to select the first transmit path 306 and the second transmit path 308 based on an adjacency criteria. However, in accordance with another embodiment, during subsequent iterations, the selection circuit 204 of the one or more circuits 202 may be configured to select the first transmit path 306 and the second transmit path 308 based on, for example, a round-robin criteria.

At 706, a first signal parameter of the second transmit signal 304 may be adjusted relative to the first signal parameter of the first transmit signal 302. The phase shift controller 212a may be configured to adjust the first signal parameter of the second transmit signal 304 relative to the first signal parameter of the first transmit signal 302.

Prior to adjustment, in accordance with an embodiment, the adder 206A of the one or more circuits 202 may be configured to add the first transmit signal 302 and the second transmit signal 304 and communicate the added signal to the TSSI 208. The TSSI 208 may be configured to indicate the first signal strength value of the added signal. In accordance with another embodiment, the subtractor 206B of the one or more circuits 202 may be configured to subtract the first transmit signal 302 and the second transmit signal 304 and communicate the subtracted signal to the TSSI 208. The TSSI 208 may be configured to indicate the second signal strength value of the subtracted signal.

The feedback circuit 210 provides the feedback signal to the calibration controller 212. The phase shift controller 212a adjusts the first signal parameter, i.e. phase, of the second transmit signal 304 relative to the first signal parameter, i.e. the phase value, of the first transmit signal 302 until the first signal strength value of the added signal is maximized or the second signal strength value of the subtracted signal is minimized.

At 708, an offset of the first signal parameter may be calibrated based on the adjusted first signal parameter of the second transmit signal 304. The calibration controller 212 of the one or more circuits 202 may be configured to calibrate the offset of the first signal parameter based on the adjusted first signal parameter of the second transmit signal 304.

At 710, a value of a second signal parameter may be calibrated based on the matching of the second signal parameter of the second transmit signal 304 relative to the second signal parameter of the first transmit signal 302. The calibration controller 212 may be further configured to calibrate a value of a second signal parameter based on the matching of the second signal parameter of the second transmit signal 304 relative to the second signal parameter of the first transmit signal 302.

Prior to the calibration of the value of the second signal parameter, the amplitude controller 212b may be configured to adjust the second signal parameter of the second transmit signal 304 until the second signal parameter of the second transmit signal 304 matches the second signal parameter of the first transmit signal 302.

At 712, an output signal with the calibrated offset of the first signal parameter and the calibrated value of the second signal parameter may be transmitted, via the plurality of antenna elements 104(1) to 104(N), to the communication network 112. The transmitter chip 106 may be configured to transmit the output signal with the calibrated offset of the first signal parameter and the calibrated value of the second signal parameter. In accordance with an embodiment, the plurality of antenna elements 104(1) to 104(N) of the antenna array 104 may be integrated in a plurality of antenna modules. In accordance with an embodiment, the one or more circuits 202 may be integrated in the plurality of antenna modules. The control passes to 726.

At 714, a plurality of output signals, similar to the output signal generated at 712 but transmitted by other transmitter chips, may be received at a plurality of input interfaces of a plurality of receive paths from the plurality of the antenna elements 104(1) to 104(N). The receiver chips 108 at the communication device 102 may receive the plurality of output signals, transmitted by the other transmitter chip, at the plurality of input interfaces of the plurality of receive paths. An optional duplex filter, connected between an antenna element in each receive path either passes a received output signal (from one of the plurality of antenna elements) along to the receive path or accepts a transmit signal over a transmission path generated by a transmitter chip in the communication device 102.

Thereafter, a first frequency of each of a first output signal and a second output signal of the plurality of output signals may be determined based on mixing of a second frequency generated by a local oscillator with both of the first output signal and the second output signal. The receiver chips 108 may determine the first frequency of the received first output signal and the received second output signal. As described above, the mixing, as described herein, is performed before the calibration operation. However, it should not be construed to be limiting the scope of the disclosure. Notwithstanding, in accordance with an embodiment, the mixing may be performed after the calibration also, without deviation from the scope of the disclosure.

Further, the LNA, connected in each of the plurality of receive paths, may amplify the first frequency of each of a first output signal and a second output signal of the plurality of output signals. The ADC may convert the output of the LNA to an input of a set of specialized circuits of the receiver chips 108. The set of specialized circuits may include a selection circuit, an adder or a subtractor, a TSSI, and a calibration controller.

At 716, a first receive path and a second receive path may be selected from the plurality of receive paths. In accordance with an embodiment, the receiver chips 108 may select the first receive path and the second receive path based on an adjacency criteria. In accordance with another embodiment, the receiver chips 108 may select the first receive path and the second receive path based on a round-robin criteria.

At 718, in accordance with an embodiment, the first output signal and the second output signal may be added. An adder at the receiver chips 108 may add the first frequencies of the first output signal and the second output signal and communicate the added signal to a TSSI circuit. In accordance with another embodiment, the first output signal and the second output signal may be subtracted. The subtractor at the receiver chips 108 may subtract the first frequencies of the first output signal and the second output signal and communicate the subtracted signal to the TSSI circuit.

At 720, in accordance with an embodiment, a first signal strength of the added signal may be indicated. In accordance with another embodiment, a second signal strength of the subtracted signal may be indicated. The TSSI may communicate the first or the second signal strength to a feedback circuit in the receiver chips 108.

At 722, one or more signal parameters in the first receive path may be calibrated relative to the second receive path. A calibration controller may calibrate the one or more signal parameters, such as the phase and the amplitude (or gain) of the first output signal with respect to the second output signal. The calibration controller may calibrate the one or more signal parameters based on the maximized first signal strength value of the added signal or the minimized second signal strength value of the subtracted signal.

At 724, a final signal may be generated based on the calibration. The receiver chips 108 may generate the final signal based on the calibration. The final signal may correspond to IIQ baseband output signal. The control passes to 726.

Various embodiments of the disclosure may provide a non-transitory computer-readable medium having stored thereon, computer implemented instruction that when executed by one or more circuits causes a calibration system to execute operations to select a first transmit path for a first transmit signal and a second transmit path for a second transmit signal. The plurality of transmit paths may be associated with a plurality of antenna elements 104(1) to 104(N). A first signal parameter of the second transmit signal 304 may be adjusted relative to the first signal parameter of the first transmit signal 302 to maximize a first signal strength value of the added signal. An offset of the first signal parameter may be calibrated based on the adjusted first signal parameter in the second transmit path 308. A value of a second signal parameter may be calibrated based on a matching of the second signal parameter in the second transmit path 308 relative to the second signal parameter in the first transmit path 306.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analogue-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A calibration system, comprising:
   one or more circuits in a transmitter chip,
   the one or more circuits are configured to:
     select, from a plurality of transmit paths within the transmitter chip, a first transmit path for a first transmit signal and a second transmit path for a second transmit signal,
     wherein the plurality of transmit paths are associated with a plurality of antenna elements of an antenna array;
     adjust a first signal parameter of the second transmit signal in the second transmit path relative to a corresponding first signal parameter of the first transmit signal in the first transmit path to one of maximize a first signal strength value of an added signal or minimize a second signal strength value of a subtracted signal;
     calibrate an offset of the corresponding first signal parameter based on the adjusted first signal parameter in the second transmit path; and
     calibrate a value of a second signal parameter of the second transmit signal based on a matching of the second signal parameter in the second transmit path relative to a corresponding second signal parameter in the first transmit path,
     wherein the second signal parameter is an amplitude of the second transmit signal.

2. The calibration system according to claim 1, wherein the selected first transmit path and the selected second transmit path are adjacent.

3. The calibration system according to claim 1, wherein the adjustment of the first signal parameter of the second transmit signal is independent of an adjustment of the second signal parameter of the second transmit signal, and wherein the first signal parameter is a phase of the second transmit signal.

4. The calibration system according to claim 1, wherein the one or more circuits in the transmitter chip are further configured to determine the added signal based on addition of the first transmit signal and the second transmit signal.

5. The calibration system according to claim 1, wherein the one or more circuits in the transmitter chip are further configured to determine the subtracted signal based on subtraction of the first transmit signal and the second transmit signal.

6. The calibration system according to claim 1, wherein the one or more circuits in the transmitter chip are further configured to transmit an output signal, via an antenna element of the plurality of antenna elements, with the calibrated offset of the first signal parameter and the calibrated value of the second signal parameter.

7. The calibration system according to claim 1, wherein the plurality of antenna elements of the antenna array are integrated in a plurality of antenna modules.

8. The calibration system according to claim 1, wherein the one or more circuits are integrated with a plurality of antenna modules.

9. A calibration system, comprising:
one or more circuits in a first transmitter chip of a plurality of transmitter chips, wherein the one or more first circuits are configured to:
receive, at an antenna element, one or more output signals from one or more second transmitter chips of the plurality of transmitter chips,
wherein each of the one or more output signals comprise a calibrated offset of a first signal parameter and a calibrated value of a second signal parameter determined at a corresponding second transmitter chip;
add or subtract, at the antenna element, the received one or more output signals;
calibrate an offset of a first signal parameter based on an adjusted first signal parameter of a second output signal relative to a corresponding first signal parameter of a first output signal,
wherein the adjustment of the first signal parameter of the second output signal maximizes a first signal strength value of the added signal or minimizes a second signal strength value of the subtracted signal; and
calibrate a value of the second signal parameter based on a matching of the second signal parameter of the second output signal relative to the second signal parameter of the first output signal,
wherein the second signal parameter is an amplitude of the second transmit signal.

10. The calibration system according to claim 9, wherein the one or more circuits in the transmitter chip are further configured to adjust the first signal parameter of the second output signal relative to the corresponding first signal parameter of the first output signal to minimize a second signal strength value of a subtracted signal.

11. A calibration system in an antenna array, comprising:
a transmitter chip configured to:
select, from a plurality of transmit paths within the transmitter chip, a first transmit path for a first transmit signal and a second transmit path for a second transmit signal, wherein the plurality of transmit paths are associated with a plurality of antenna elements of the antenna array;
adjust a first signal parameter of the second transmit signal relative to a corresponding first signal parameter of the first transmit path to maximize a first signal strength value of an added signal or minimize a second signal strength value of a subtracted signal;
calibrate an offset of the corresponding first signal parameter based on the adjusted first signal parameter in the second transmit path; and
calibrate a value of a second signal parameter based on a matching of the second signal parameter in the second transmit path relative to the second signal parameter in the first transmit path; and
a receiver chip configured to:
receive a plurality of output signals, transmitted by the transmitter chip, at a plurality of input interfaces of a plurality of receive paths;
select a first receive path and a second receive path from the plurality of receive paths in the receiver chip;
calibrate one or more signal parameters in the first receive path relative to the second receive path based on one of maximized first signal strength value of addition of a first output signal and a second output signal of the plurality of output signals or minimized second signal strength value of subtraction of the first output signal and the second output signal; and
generate a signal based on the calibration.

12. The calibration system according to claim 11,
wherein the selected first transmit path and the selected second transmit path are adjacent, and
wherein the selected first receive path and the selected second receive path are adjacent.

13. The calibration system according to claim 11, wherein the a receiver chip is further configured to determine, a first frequency of each of the first output signal and the second output signal of the plurality of output signals, based on mixing of a second frequency generated by a local oscillator with both of the first output signal and the second output signal.

14. A non-transitory computer-readable medium having stored thereon, computer executable instruction that when executed by a computer, cause the computer to execute instructions, comprising:
in a transmitter chip provided in an antenna array, the transmitter chip:
selecting, from a plurality of transmit paths within the transmitter chip, a first transmit path for a first transmit signal and a second transmit path for a second transmit signal, wherein the plurality of transmit paths are associated with a plurality of antenna elements of the antenna array;
adjusting a first signal parameter of the second transmit signal relative to a corresponding first signal parameter of the first transmit path to one of maximize a first signal strength value of an added signal or minimize a second signal strength value of a subtracted signal;
calibrating an offset of the corresponding first signal parameter based on the adjusted first signal parameter in the second transmit path; and
calibrating a value of a second signal parameter of the second transmit signal based on a matching of the second signal parameter in the second transmit path relative to a corresponding second signal parameter in the first transmit path,
wherein the second signal parameter is an amplitude of the second transmit signal.

* * * * *